United States Patent [19]

Kelsall

[11] 4,033,451
[45] July 5, 1977

[54] SELF-COUNTERWEIGHTED TAKE-UP

[75] Inventor: Frederick A. Kelsall, Milwaukee, Wis.

[73] Assignee: Rexnord Inc., Milwaukee, Wis.

[22] Filed: Sept. 12, 1975

[21] Appl. No.: 612,985

[52] U.S. Cl. .............................................. 198/815
[51] Int. Cl.² ...................................... B65G 15/30
[58] Field of Search ................. 198/208, 16 R, 329, 198/813, 815; 74/242.8, 242.11 R, 242.11 C, 242.11 P, 242.11 W, 242.11 L, 242.12, 242.13 R, 242.15 R

[56] References Cited

UNITED STATES PATENTS

| | | | |
|---|---|---|---|
| 2,295,401 | 9/1942 | Hansen | 198/208 |
| 2,326,098 | 8/1943 | Kimmich | 198/208 |
| 2,472,914 | 6/1949 | Mercier | 198/208 |
| 2,628,707 | 2/1953 | Shacikoski | 198/208 |
| 2,648,424 | 8/1953 | Bateman | 198/208 |
| 3,101,145 | 8/1963 | Koski et al. | 198/208 |
| 3,433,236 | 3/1969 | Koch et al. | 198/208 |
| 3,536,185 | 10/1970 | Beck | 198/815 |
| 3,926,296 | 12/1975 | Woodling et al. | 198/16 R |

Primary Examiner—Evon C. Blunk
Assistant Examiner—Joseph E. Valenza
Attorney, Agent, or Firm—Sughrue, Rothwell, Mion, Zinn & Macpeak

[57] ABSTRACT

The self-counterweighted take-up assemblies disclosed herein are especially adapted for use with endless conveyor systems comprising a headshaft, a footshaft, an endless conveyor trained around the headshaft and the footshaft, and a first frame which is immobile relative to the headshaft. Speaking broadly, two general types of self-counterweighted take-up assemblies are disclosed herein. In the first, a second frame is pivotably mounted about an axis parallel to and spaced from the footshaft, take-up bearings journalling the footshaft are mounted on the second frame, and means are provided for moving the footshaft in the take-up bearings in order to maintain tension in the endless conveyor as it varies in length, permitting the second frame to pivot about its axis. In the second, a wire rope is connected to each end of the footshaft and the wire rope[s] is or are connected to the first frame so as to maintain tension in the endless conveyor as it varies in length.

46 Claims, 14 Drawing Figures

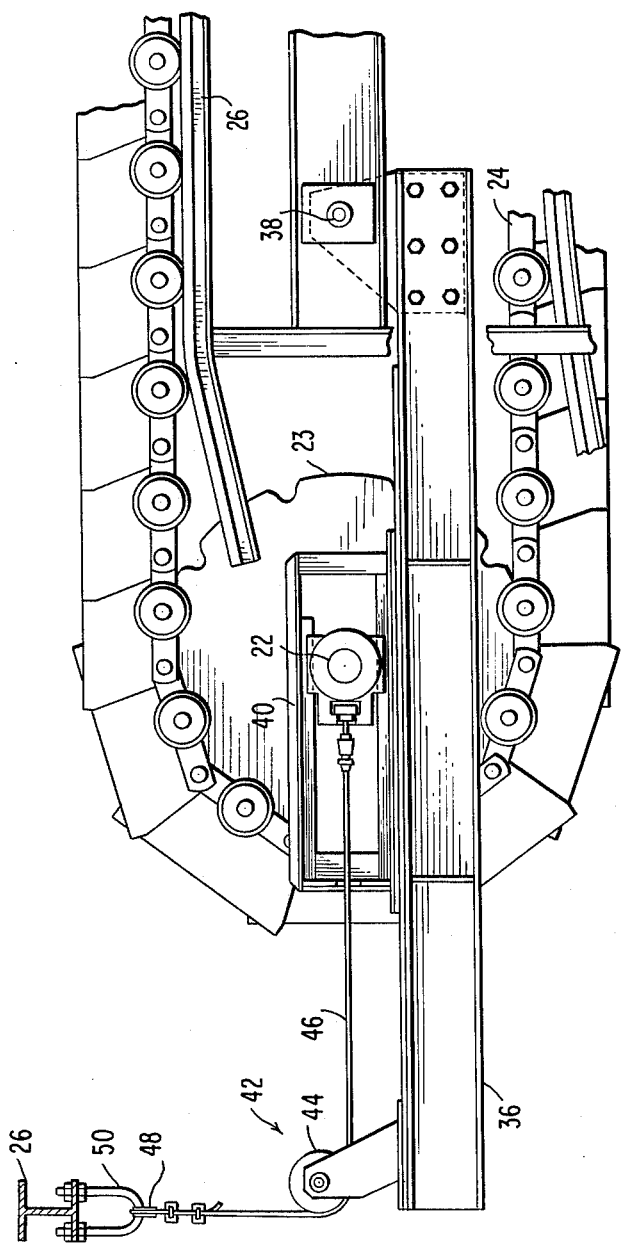
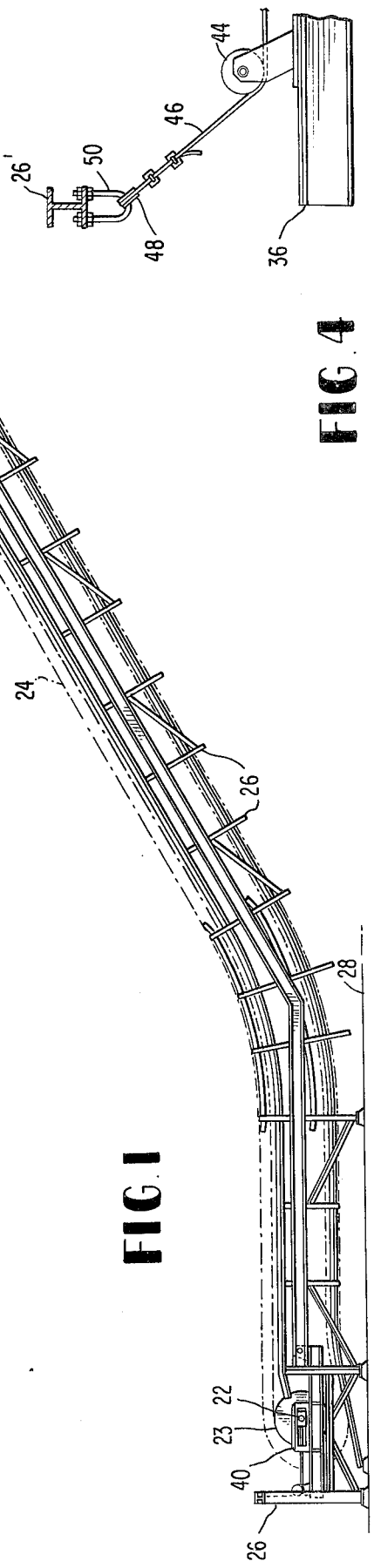
FIG. 1  FIG. 2  FIG. 4

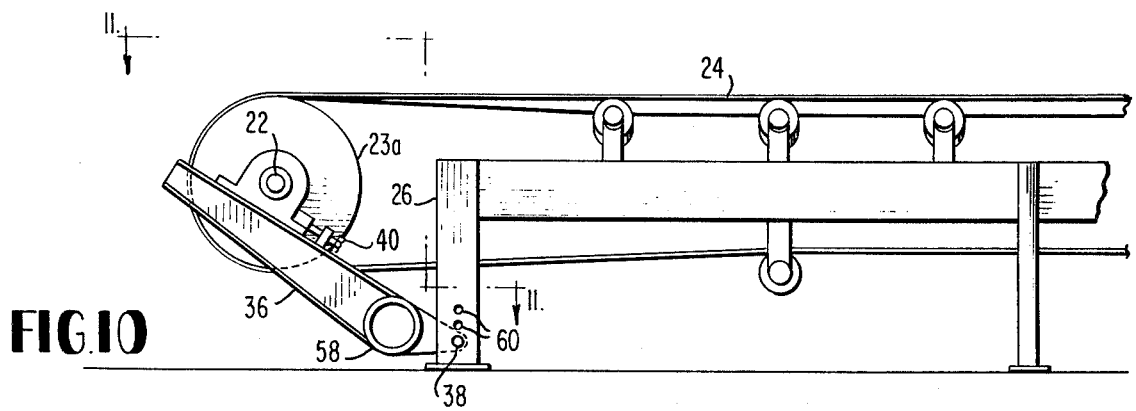
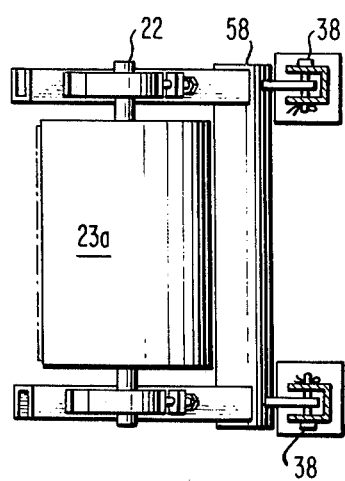
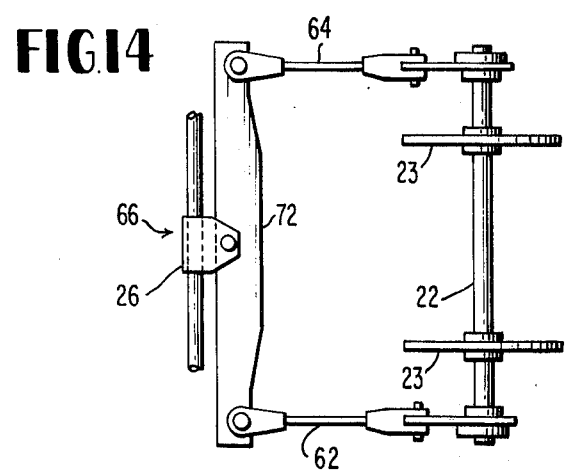
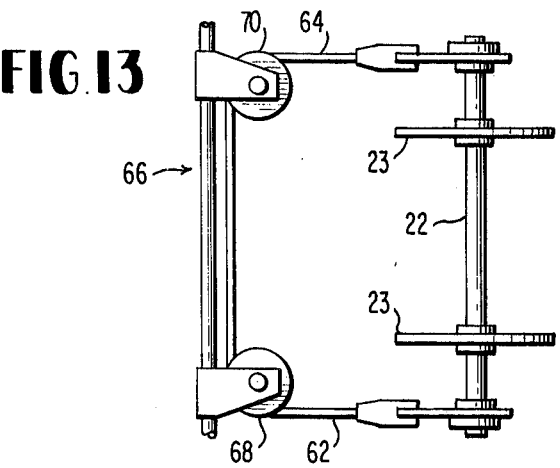
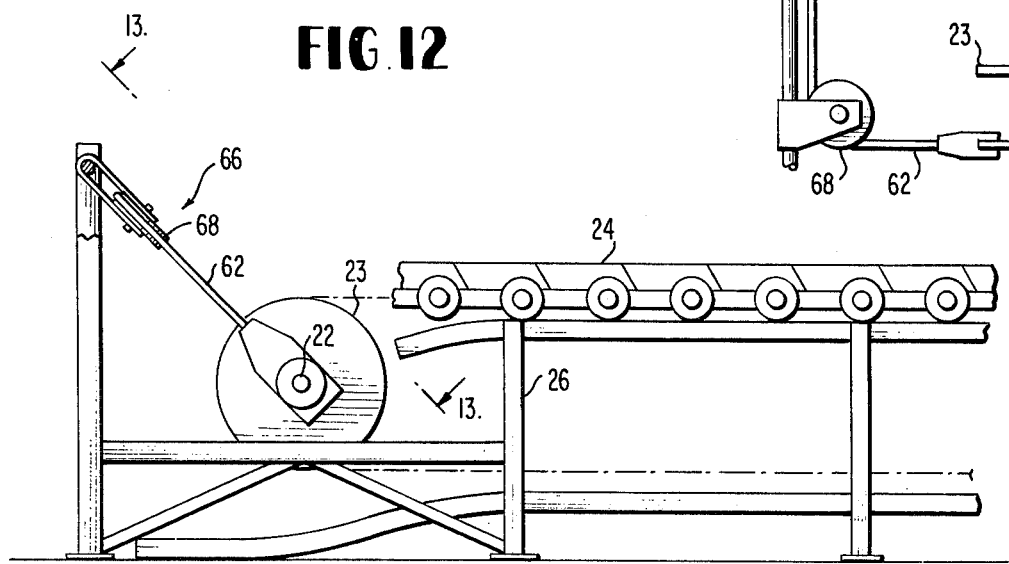

SELF-COUNTERWEIGHTED TAKE-UP

FIELD OF THE INVENTION

This invention relates to endless conveyor systems of the type which comprise a headshaft, a footshaft, an endless conveyor trained around the headshaft and the footshaft, and a first frame which is immobile relative to the headshaft. The purpose of the invention is to employ the weight of the footshaft assembly to compensate for variations in the length of the endless conveyor in order to maintain the tension in the endless conveyor within desired parameters.

SUMMARY OF THE INVENTION

Speaking broadly, the self-counterweighted take-up assemblies disclosed herein are especially adapted for use with endless conveyor systems comprising a headshaft, a footshaft, an endless conveyor trained around the headshaft and the footshaft, and a first frame which is immobile relative to the headshaft. Two general types of self-counterweighted take-up assemblies are disclosed herein. In the first, a second frame is pivotably mounted about an axis parallel to and spaced from the footshaft, take-up bearings journalling the footshaft are mounted on the second frame, and means are provided for moving the footshaft in the take-up bearings in order to maintain tension in the endless conveyor as it varies in length, permitting the second frame to pivot about its axis. In the second, a wire rope is connected to each end of the footshaft and the wire rope[s] is or are connected to the first frame so as to maintain tension in the endless conveyor as it varies in length.

BRIEF DESCRIPTION OF THE DRAWINGS

FIG. 1 is a side view of an endless conveyor system incorporating the present invention.

FIG. 2 is a side view of a first embodiment of a self-counterweighted take-up assembly according to the present invention.

FIG. 4 is a side view of a portion of a second embodiment of a self-counterweighted take-up assembly according to the present invention.

FIG. 10 is a side view of a seventh embodiment of a self-counterweighted take-up assembly according to the present invention.

FIG. 11 is a view along the lines 11—11 in FIG. 10.

FIG. 12 is a side view of an eighth embodiment of a self-counterweighted take-up assembly according to the present invention.

FIG. 13 is a view along the lines 13—13 in FIG. 12.

FIG. 14 is a view corresponding to FIG. 13 of a portion of a ninth embodiment of a self-counterweighted take-up assembly according to the present invention.

DETAILED DESCRIPTION OF THE PREFERRED EMBODIMENTS

Figure 3:
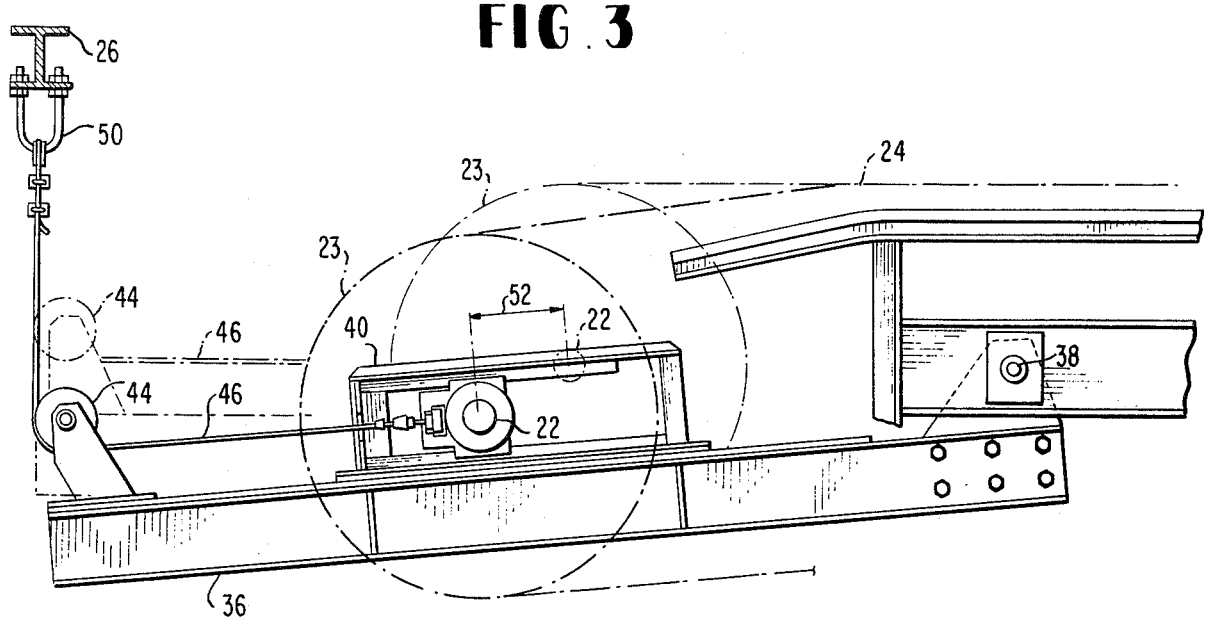
FIG. 3 is a somewhat schematic side view of the embodiment of the present invention shown in FIG. 2 showing the movement of the footshaft as the take-up mechanism functions.

FIG. 1 shows an endless conveyor system comprising a headshaft 20, a sprocket 21 mounted on the headshaft 20, a footshaft 22, a sprocket 23 mounted on the footshaft 22, an endless conveyor 24 trained around the headshaft 20 and the footshaft 22, and a frame 26 which is immobile relative to the headshaft 20. The frame 26 is shown as one unitary structure, but of course it could comprise separate structures each independently directly or indirectly mounted on the floor 28. A motor 30 is provided to rotate the headshaft 20 via a belt 32 and a sheave 34.

Of course, sprockets corresponding to sprocket 21 and 23 are provided on the far side of the endless conveyor 24, but their depiction is omitted as unnecessary to an understanding of the invention.

The presently most preferred embodiment of the present invention is shown in FIG. 2. A frame 36 is pivotably mounted about the axis of a shaft or shafts 38 which is or are parallel to the footshaft 22. As shown, the shaft[s] 38 is or are located between the headshaft 20 and the footshaft 22; in a long conveyor system as shown in FIG. 1, the shaft[s] 38 is or are located relatively close to the footshaft 22. Although not shown in the drawings, the shaft[s] 38 could also be located on the other side of the footshaft 22. Take-up bearings 40, which can be ordinary screw take-up bearings with the screws removed, are mounted on the frame 36, and the footshaft 22 is journalled therein. Finally, means 42 are provided for moving the footshaft 22 in the take-up bearings 40 so as to maintain tension in the endless conveyor 24 as it varies in length (due to temperature changes, chain wear, belt stretch, or other causes), permitting the frame 36 to pivot about its axis.

In the presently most preferred embodiment, the means 42 comprise a tension direction changing means, such as the sheave 44, mounted on the frame 36 on the other side of the take-up bearing 40 from the axis about which the frame 36 pivots and a flexible, linear tension transmission means, such as the wire rope 46, trained around the tension direction changing means and connected at one end to the footshaft 22 and at the other end to the frame 26. The flexible, linear tension transmission means is preferably substantially inextensible, but it need not be. In the embodiment shown in FIG. 2, the wire rope 46 is fitted around a thimble 48, which is freely mounted on a curved member 50 which is attached to or a part of the frame 26.

FIG. 3 illustrates the operation of the apparatus shown in FIG. 2. As the endless conveyor 24 lengthens, permitting the sheave 44 to move about the axis of the shaft 38, the wire rope 46 pulls the footshaft a distance indicated by the double-headed arrow 52 to the position shown in solid line. Correspondingly, if the endless conveyor 24 shortens (as by contraction due to a decrease in temperature), its shortening will pull the footshaft 22 towards the right in FIG. 3, causing the frame 36 to pivot back to the position shown in broken line.

As the footshaft 22 moves, the weight of the footshaft 22, the sprocket 23, the frame 36, the take-up bearing 40, and the sheave 44, which in the aggregate can be very substantial, pulls against the endless conveyor 24, acting as a self-couterweighted take-up assembly. Of course additional weights can be added to the frame 36 if the weight of the operative parts is insufficient to provide the desired tension in the endless conveyor 24, and the pull exerted by the assembly can be varied by varying the relationship of the shaft 38 to the footshaft 22 at rest position and by varying the relationship of the curved member 50 to the sheave 44. While the tension in the endless conveyor 24 does vary as a function of the angle through which the frame 36 is pivoted about the shaft 38, the variation is minor and does not appreciably affect the utility of the invention for most if not all applications.

A portion of a second embodiment of the present invention is shown in FIG. 4. In this enbodiment, the wire rope 46 is connected to a portion 26' of the frame 26 which is laterally spaced from the sheave 44, rather than being substantially above it as in FIGS. 2 and 3. As previously stated, variations in the positioning of the point on the frame 26 to which the wire rope 46 is attached can be used to vary the pull exerted by the weight of the self-counterweighted take-up assembly.

Figure 5:
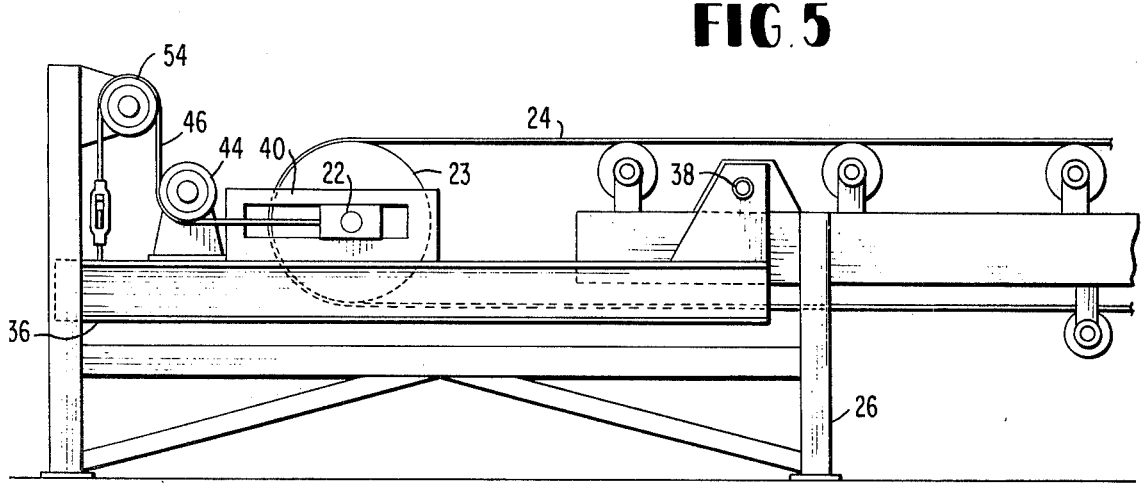
FIG. 5 is a side view of a third embodiment of a self-counterweighted take-up assembly according to the present invention.
Figure 6:
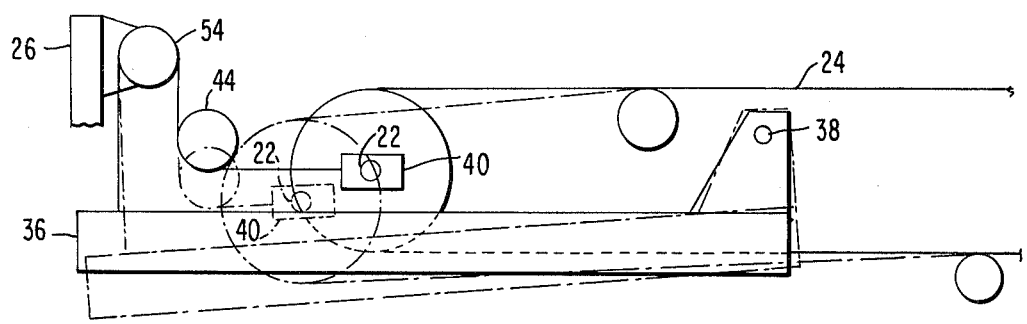
FIG. 6 is a somewhat schematic side view of the embodiment of the present invention shown in FIG. 5 showing the movement of the footshaft as the take-up mechanism functions.

A third embodiment of the present invention is shown in FIGS. 5 and 6. In this embodiment, the wire rope 46 is passed around a second tension direction changing means, such as the sheave 54, mounted on the frame 26 before it is connected to the frame 36 at its end opposite to the end connected to the footshaft 22. In this embodiment, rotational motion of the frame 36 about the shaft 38 causes roughly twice the linear displacement of the footshaft 22 that corresponding rotational motion does in the first two embodiments, since both the length of the wire rope 46 from the sheave 40 to the sheave 54 and the length of the wire rope 46 from the sheave 54 to the frame 36 are affected.

Figure 7:
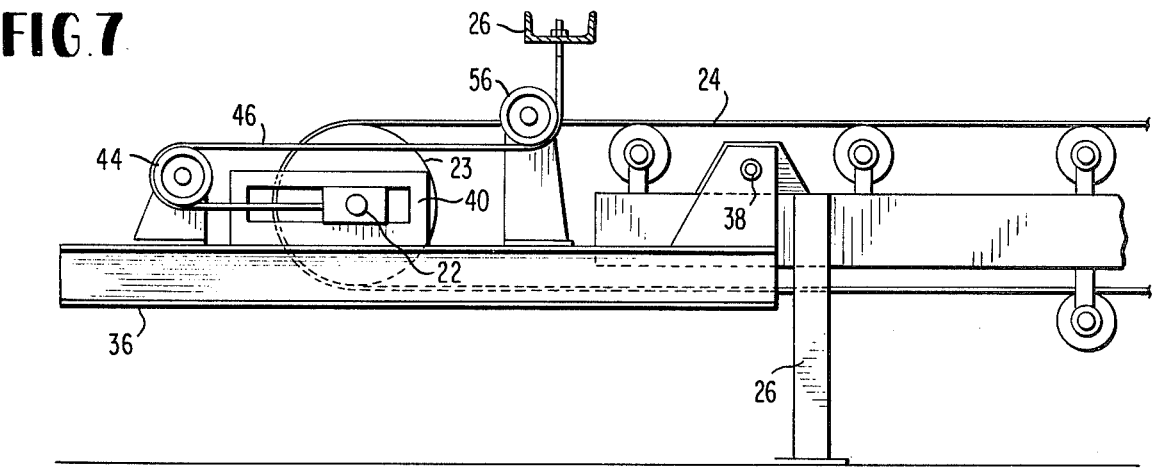
FIG. 7 is a side view of a fourth embodiment of a self-counterweighted take-up assembly according to the present invention.

FIG. 7 shows a fourth embodiment of the present invention. In this embodiment, after the wire rope 46 is trained around the sheave 44, it is passed around an additional tension direction changing means, such as the sheave 56, before it is connected to the frame 26. Variations in the location of the sheave 56 can be used to vary the pull exerted by the self-counterweighted take-up assembly on the endless conveyor.

Figure 8:
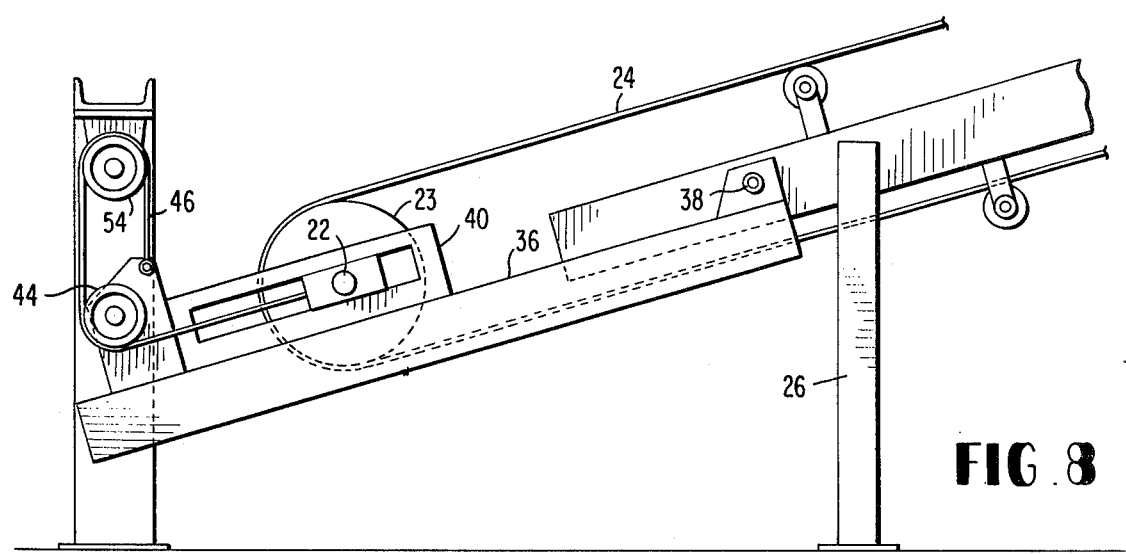
FIG. 8 is a side view of a fifth embodiment of a self-counterweighted take-up assembly according to the present invention.

FIG. 8 shows a fifth embodiment of the present invention. In this embodiment, the conveyor is inclined, but the construction otherwise corresponds to FIG. 5.

Figure 9:
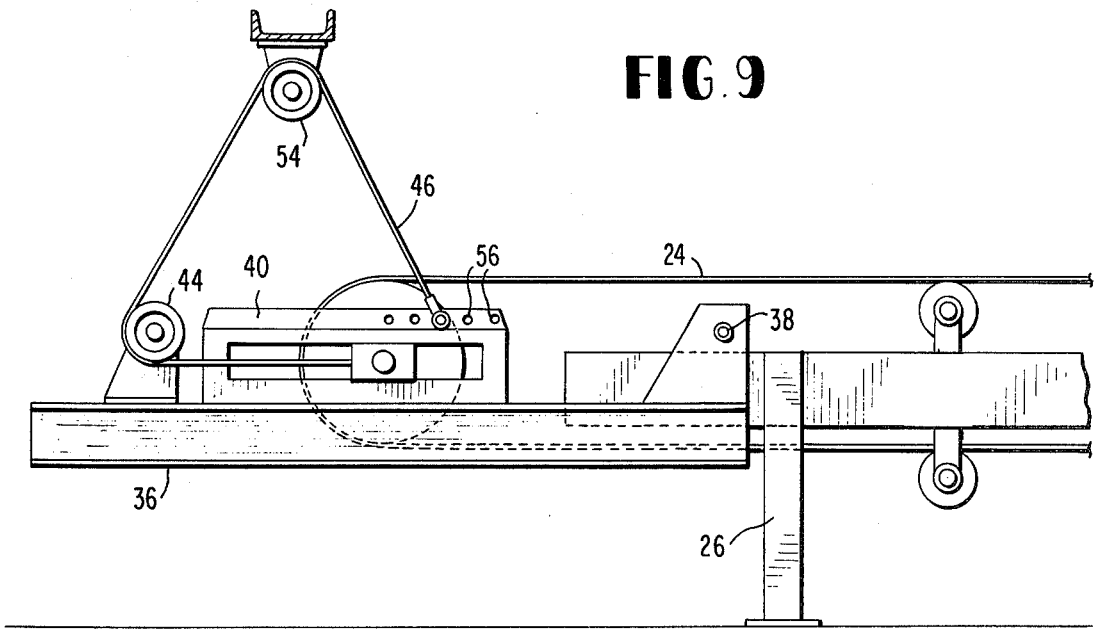
FIG. 9 is a side view of a sixth embodiment of a self-counterweighted take-up assembly according to the present invention.

FIG. 9 shows a sixth embodiment of the present invention, this embodiment also being kinematically equivalent to the FIG. 5 embodiment. However, this embodiment expressly illustrates means for adjusting the location on the frame 36 to which the wire rope 46 is connected. In this embodiment, the plurality of pre-provided holes 56 on the take-up bearing 40 permit the wire rope 46 to be connected to the frame 36 at a plurality of positions, each one of which establishes a different effective pull for the self-counterweighted take-up assembly.

FIGS. 10 and 11 show a seventh and significantly different embodiment of the present invention. In this embodiment, the footshaft 22 carries a pulley 23a, the footshaft 22 is simply pivoted about the shafts 38, the shafts 38 pivot a tubular cross member 58 on which the footshaft 22 is mounted, and adjustable bearings 40 are provided for alignment. A plurality of holes 60 are provided in the frame 36 to permit variations in the location of the shafts 38 to vary the tension in the endless conveyor 24.

FIGS. 12 and 13 show an eighth embodiment of the present invention which is also significantly different than all the previously described embodiment. In this embodiment, a first flexible, linear tension transmission means, illustrated by the wire rope 62, is connected to one end of the footshaft 22, a second flexible, linear tension transmission means, illustrated by the wire rope 64, is connected to the other end of the footshaft 22, and means 66 are provided for maintaining tension in the endless conveyor 24 as it varies in length. In the embodiment illustrated in FIGS. 12 and 13, the means 66 comprises a first tension direction changing means, illustrated by the sheave 68, mounted on the frame 26 adjacent to the first end of the footshaft 22, and a second tension direction changing means, illustrated by the sheave 70, mounted on the frame 26 adjacent to the second end of the footshaft 22, the wire ropes 62 and 64 being joined together into one rope at their ends remote from the footshaft 22, and the wire ropes 62 and 64 being trained around the sheaves 68 and 70. The two sheaves 68 and 70 could conceivably be replaced by a single centrally located sheave, but this construction is not believed to be practical for heavy loads and is not illustrated.

FIG. 14 shows a ninth embodiment of the present invention, which embodiment corresponds kinematically to the eighth embodiment. In this embodiment, a bar 72 is pivotably mounted on the frame 26, the wire rope 62 is connected to the bar 72 on one side of the point about which it is pivoted, and the wire rope 64 is connected to the bar 72 on the other side of the point about which it is pivoted.

In both the eighth and ninth illustrated embodiments of the present invention, the assembly composed of the footshaft 22 and the sprockets 23 hangs at a position defined by the equilibrium of the tension forces in the endless conveyor 24, the tension forces in the wire ropes 62 and 64, and the weight of the assembly. If the endless conveyor 24 varies in length, the assembly swings to a new position. Of course, if the weight of the assembly is not sufficient to create the desired tension in the endless conveyor 24, it is possible to suspend additional weights from the footshaft 22. When, as illustrated in FIGS. 12-14, the endless conveyor 24 is trained about the footshaft 22 by means of two spaced tension direction changing means over which two independently extensible, flexible, linear tension transmission means are trained, if one of the two varies more in length than the other, the assembly is allowed to shift its alignment slightly, compensating for the discrepancy.

While not illustrated herein, the invention described herein readily lends itself to the provision of limiting checks to guard against failure of take-up ropes, conveyors, etc., and to the provision of safety alarm switches. Such checks and alarms would, of course, normally be provided in a commercial embodiment.

CAVEAT

While the present invention has been illustrated by a detailed description of a plurality of preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. An endless conveyor system having a self-counterweighted take-up assembly, said conveyor system comprising:
   a. a headshaft;
   b. a first return training means carried by said headshaft;
   c. a footshaft;
   d. a second return training means carried by said footshaft;
   e. an endless conveyor trained around said first and second return training means;
   f. a first frame which is immobile relative to said headshaft;
   g. a second frame;
   h. take-up bearings mounted on said second frame for journalling the ends of said footshaft for longitudinal sliding;
   i. first means for pivotably mounting said second frame about an axis parallel to said footshaft and spaced from said footshaft on one side of said take-up bearings; and
   j. second means for permitting said second frame to pivot about its axis as the ends of said footshaft move in said take-up bearings during use of the conveyor system, whereby tension is maintained in said endless conveyor as said endless conveyor varies in length by the force of gravity acting on said footshaft and said second return training means.

2. An endless conveyor system as claimed in claim 1 wherein said second means comprises:
   a. first tension direction changing means mounted on said second frame on the other side of each of said take-up bearings from the axis about which said second frame pivots and
   b. a flexible, linear tension transmission means trained around said first tension direction changing means and connected at one end to said footshaft and at the other end to said first frame.

3. An endless conveyor system as claimed in claim 2 wherein said flexible, linear tension transmission means are wire ropes.

4. An endless conveyor system as claimed in claim 2 wherein said first tension direction changing means are sheaves.

5. An endless conveyor system as claimed in claim 2 and further comprising second tension direction changing means mounted on said second frame and wherein said flexible, linear tension transmission means are trained around said second tension direction changing means in between said first tension direction changing means and said first frame.

6. An endless conveyor system as claimed in claim 5 wherein said first and second tension direction changing means are sheaves.

7. An endless conveyor system as claimed in claim 5 wherein said flexible, linear force transmission means are wire ropes.

8. An endless conveyor system as claimed in claim 1 wherein said second means comprises:
   a. first tension direction changing means mounted on said second frame on the other side of said take-up bearings from the axis about which said second frame pivots;
   b. second tension direction changing means mounted on said first frame; and
   c. flexible, linear tension transmission means trained around said first and second tension direction changing means and connected at one end to said footshaft and at the other end to said second frame.

9. An endless conveyor system as claimed in claim 8 wherein said flexible, linear tension transmission means are wire ropes.

10. An endless conveyor system as claimed in claim 8 and further comprising means for adjusting the location on said second frame to which said flexible, linear tension transmission means are connected.

11. An endless conveyor system as claimed in claim 10 wherein said flexible, linear tension transmission means are wire ropes.

12. An endless conveyor system as claimed in claim 8 wherein said first and second tension direction changing means are sheaves.

13. An endless conveyor system having a self-counterweighted take-up assembly, said conveyor system comprising:
   a. a headshaft;
   b. a first return training means carried by said headshaft;
   c. a footshaft;
   d. a second return training means carried by said footshaft;
   e. an endless conveyor trained around said first and second return training means;
   f. a frame which is immobile relative to said headshaft;
   g. a first flexible, linear tension transmission means connected at one end to one end of said footshaft and at the other end to said frame;
   h. a second flexible, linear tension transmission means connected at one end to the other end of said footshaft and at the other end to said frame; and
   i. means for permitting said footshaft to move longitudinally of said frame and to pivot transversely of said frame, whereby tension is maintained in said endless conveyor as said endless conveyor varies in length by the force of gravity acting on said footshaft and said second return training means.

14. An endless conveyor system as claimed in claim 13 wherein
   a. said means comprise a bar pivotably mounted on said frame and
   b. said first flexible, linear tension transmission means is connected to said bar on one side of the point about which it is pivoted and said second flexible, linear tension transmission means is connected to said bar on the other side of the point about which it is pivoted 15. An endless conveyor system as claimed in claim 14 wherein said first and second flexible, linear tension transmission means are wire ropes.

16. An endless conveyor system as claimed in claim 13 wherein said endless conveyor is trained about said footshaft by means of two spaced tension direction changing means over which two independently extensible, flexible linear tension transmission means are trained.

17. An endless conveyor system as claimed in claim 16 wherein
   a. said means comprise a bar pivotably mounted on said frame and b. said first flexible, linear tension transmission means is connected to said bar on one side of the point about which it is pivoted and said second flexible, linear tension transmission means is connected to said bar on the other side of the point about which it is pivoted.

18. An endless conveyor system as claimed in claim 17 wherein said first and second flexible, linear tension transmission means are wire ropes.

19. An endless conveyor system as claimed in claim 13 wherein said first and second return training means are mounted on said headshaft and said footshaft, respectively.

20. An endless conveyor system having a self-counterweighted take-up assembly, said conveyor system comprising:
   a. a headshaft;
   b. a first return training means carried by said headshaft;
   c. a footshaft;
   d. a second return training means carried by said footshaft;
   e. an endless conveyor trained around said first and second return training means;
   f. a frame which is immobile relative to said headshaft;
   g. means for permitting said footshaft to move longitudinally of said frame and to pivot transversely of said frame, whereby tension is maintained in said endless conveyor as said endless conveyor varies in length by the force of gravity acting on said footshaft and said second return training means, said means comprising at least one tension direction changing means mounted on said frame; and
   h. a flexible, linear tension transmission means trained around said tension direction changing means and connected at its first end to one end of said footshaft and at its other end to the other end of said footshaft.

21. An endless conveyor system as claimed in claim 20 wherein said flexible, linear tension transmission means is a wire rope.

22. An endless conveyor system as claimed in claim 20 wherein said tension direction changing means is a sheave.

23. An endless conveyor system as claimed in claim 20 wherein
   a. said means comprise a first tension direction changing means mounted on said frame adjacent to a first end of said footshaft and a second tension direction changing means mounted on said frame adjacent to a second end of said footshaft and
   b. said flexible, linear tension transmission means is trained around said first and second tension direction changing means.

24. An endless conveyor system as claimed in claim 23 wherein said flexible, linear tension transmission means is a wire rope.

25. An endless conveyor system as claimed in claim 23 wherein said first and second tension direction changing means are sheaves.

26. An endless conveyor system as claimed in claim 20 wherein said first and second return training means are mounted on said headshaft and said footshaft, respectively.

27. An endless conveyor system as claimed in claim 20 wherein said endless conveyor is trained about said second return training means by means of two spaced tension direction changing means over which two independently extensible, flexible linear tension transmission means are trained.

28. An endless conveyor system as claimed in claim 27 wherein said flexible, linear tension transmission means is a wire rope.

29. An endless conveyor system as claimed in claim 27 wherein said tension direction changing means is a sheave.

30. An endless conveyor system as claimed in claim 27 wherein
   a. said means comprises a first tension direction changing means mounted on said frame adjacent to a first end of said footshaft and a second tension direction changing means mounted on said frame adjacent to a second end of said footshaft and
   b. said flexible, linear tension transmission means is trained around said first and second tension direction changing means.

31. An endless conveyor system as claimed in claim 30 wherein said flexible, linear tension transmission means is a wire rope.

32. An endless conveyor system as claimed in claim 30 wherein said first and second tension direction changing means are sheaves.

33. A self-counterweighted take-up assembly for an endless conveyor system comprising a headshaft, a first return training means carried by said headshaft, a footshaft, a second return training means carried by said footshaft, an endless conveyor trained around said first and second return training means, and a first frame which is immobile relative to said headshaft, said self-counterweighted take-up assembly comprising:
   a. a second frame;
   b. take-up bearings mounted on said second frame to journal the ends of said footshaft for longitudinal sliding;
   c. first means pivotably mounting said second frame about an axis parallel to said footshaft and spaced from said footshaft on one side of said take-up bearings; and
   d. second means for permitting said second frame to pivot about its axis as the ends of said footshaft move in said take-up bearings during use of the conveyor system, whereby tension is maintained in said endless conveyor as said endless conveyor varies in length by the force of gravity acting on said footshaft and said second return training means.

34. A self-counterweighted take-up assembly as claimed in claim 33 wherein said second means comprises:
   a. first tension direction changing means mounted on said second frame on the other side of each of said take-up bearings from the axis about which said second frame pivots and
   b. flexible, linear tension transmission means trained around said first tension direction changing means and connected at one end to said footshaft and at the other end to said first frame.

35. A self-counterweighted take-up assembly as claimed in claim 34 wherein said flexible, linear tension transmission means are wire ropes.

36. A self-counterweighted take-up assembly as claimed in claim 34 wherein said first and second circular tension transmission means are sheaves.

37. A self-counterweighted take-up assembly as claimed in claim 34 and further comprising second tension direction changing means mounted on said second frame and wherein said flexible, linear tension transmission means are trained around said second tension direction changing means in between said first tension direction changing means and said first frame.

38. A self-counterweighted take-up assembly as claimed in claim 37 wherein said first and second tension direction changing means are sheaves.

39. A self-counterweighted take-up assembly as claimed in claim 37 wherein said flexible, linear tension transmission means are wire ropes.

40. A self-counterweighted take-up assembly as claimed in claim 33 wherein said means comprises:
   a. first tension direction changing means mounted on said second frame on the other side of said take-up bearings from the axis about which said second frame pivots;
   b. second tension direction changing means mounted on said first frame; and
   c. flexible, linear tension transmission means trained around said first and second tension direction changing means and connected at one end to said footshaft and at the other end to said second frame.

41. A self-counterweighted take-up assembly as claimed in claim 40 wherein said flexible, linear tension transmission means are wire ropes.

42. A self-counterweighted take-up assembly as claimed in claim 40 and further comprising means for adjusting the location on said second frame to which said flexible, linear tension transmission means are connected.

43. A self-counterweighted take-up assembly as claimed in claim 42 wherein said flexible, linear tension transmission means are wire ropes.

44. A self-counterweighted take-up assembly as claimed in claim 40 wherein said first and second tension direction changing means are sheaves.

45. An endless conveyor system as claimed in claim 33 wherein said first and second return training means are mounted on said headshaft and said footshaft, respectively.

46. An endless conveyor system as claimed in claim 1 wherein said first and second return training means are mounted on said headshaft and said footshaft, respectively.

* * * * *